3,184,333
WET-STRENGTH PAPER COMPRISING HIGHLY OXIDIZED PERIODATE OXYSTARCH AND PROCESS OF PREPARING THE SAME

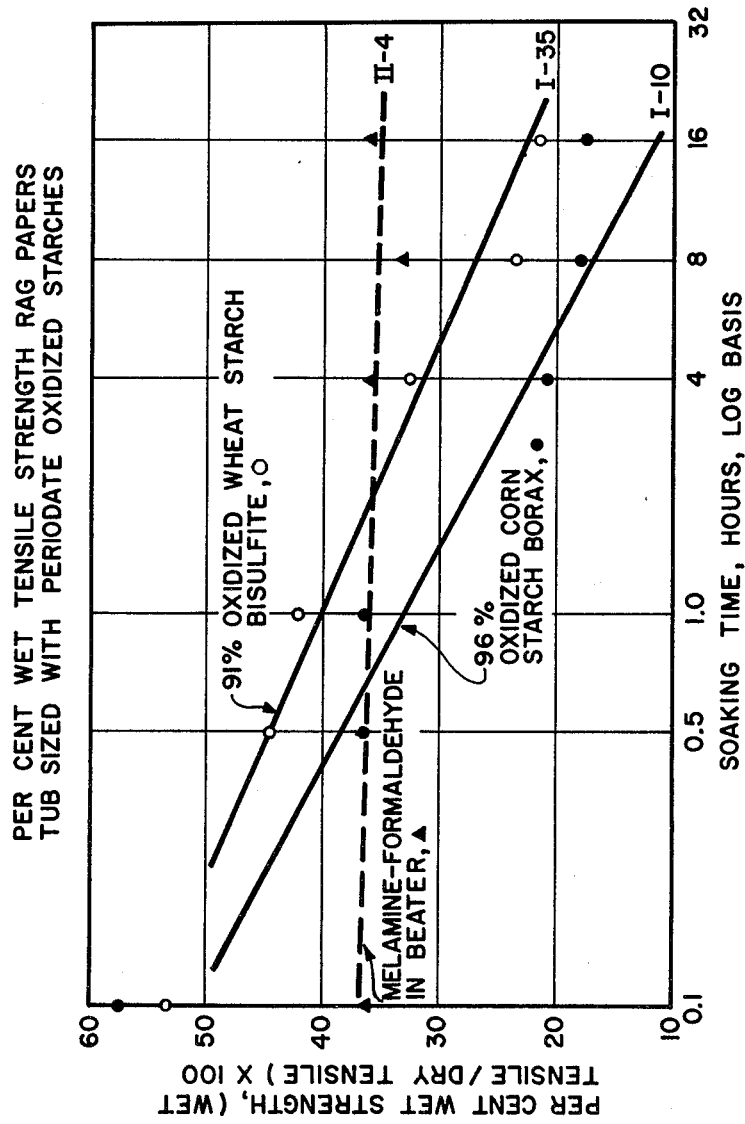

John W. Swanson and Edward J. Jones, Appleton, Wis., and Charles L. Mehltretter, Peoria, Ill., assignors to the United States of America as represented by the Secretary of Agriculture
Filed Feb. 12, 1963, Ser. No. 258,090
3 Claims. (Cl. 117—156)

This is a continuation-in-part of application Serial No. 779,036, filed December 8, 1958, now abandoned.

A non-exclusive, irrevocable, royalty-free license in the invention herein described, throughout the world for all purposes of the United States Government, with the power to grant sublicenses for such purposes, is hereby granted to the Government of the United States of America.

This invention relates to paper which is characterized by greatly improved wet-strength properties and to a method of preparing the same by the use of dialdehyde starch (also called periodate oxystarch), which oxypolysaccharides comprise the subject matter of United States Patent No. 2,713,553 to Mehltretter, the disclosure of which patent is herewith incorporated by reference.

It is well known to improve the wet-strength of paper by subjecting the paper to an impregnating and coating composition comprising a synthetic resin such as melamine-formaldehyde or urea-formaldehyde.

Unexpectedly, it has now been found that the substitution of a dialdehyde starch composition in place of a synthetic resin dispersion applied by a conventional tub-dip and hot-roll drying sequence greatly increases the wet-strength over that obtainable with the resin. The advantageous wet-strength superiority of paper treated with dialdehyde starch is shown by the data set forth in Tables I and II and by the data of the drawing. It will also be apparent that the improved wet-strength property of the dialdehyde starch treated paper is stable to aging since there are no significant differences in the wet-strength values in items 1–2, 12, and 13 of Table I, which are determined 10 to 12 months after treating the paper, and the wet-strength values found in the remaining test items, which were performed within several days of the treatment.

An additional aspect of this invention is the discovery that the dispersability of the dialdehyde starch and both the wet-strength and dry-strength properties of the untreated paper are improved by first cooking the dialdehyde starch for about 30 minutes at up to 95° C. with a small percentage of borax or with a weakly acidic material such as a bisulfite or sulfurous acid, or with a weakly alkaline material such as a bicarbonate, a carbonate, or dilute sodium hydroxide. Conventional sizing agents may also be added to the treating composition when desired.

Although the results set forth in Tables I and II have been obtained by applying the dialdehyde starch as in a sizing bath, it is obvious that other modifications will be readily apparent to those skilled in the art.

The following example will illustrate our invention.

EXAMPLE 1

1.8 gm. (1.8 parts by weight) of borax $$(Na_2B_4O_7 \cdot 10H_2O)$$

were dissolved in 700 ml. water at room temperature, and 50 gm. (50 parts by weight) of oven-dry corn starch that had been oxidized by periodic acid to the extent of 90 percent of theory was slowly added to the slightly alkaline dispersant solution with mechanical agitation which was continued while the periodate-oxystarch dispersion was heated on a steam bath up to 88° C. in 18 minutes. The clear dispersion was removed from the steam bath, cooled to room temperature, and enough water was added to bring the volume to 1,000 ml. and provide a paper-treating solution containing 5 percent by weight of the highly oxidized starch. The characteristics of paper sheets that were tub-sized in this solution are presented as item 6 (Institute of Paper Chemistry, File No. 177,253) of Table I.

*Table I*

WET-TENSILE STRENGTH OF RAG PAPERS TUB-SIZED WITH PERIODATE-OXIDIZED STARCHES

| Item No. | I.P.C. File No. | Treatment | Concentration size bath, percent | Uptake of size, percent | Schopper tensile in machine direction, lb./inch | | | | | | |
|---|---|---|---|---|---|---|---|---|---|---|---|
| | | | | | Dry | Wet | | | | | |
| | | | | | | 5 min. soaking | 30 min. soaking | 60 min. soaking | 4 hr. soaking | 8 hr. soaking | 16 hr. soaking |
| 1 | 173429 | Untreated paper | | | 25.1 | 4.0 | 4.0 | 3.9 | | | |
| 2 | 174140 | Untreated paper | | | 27.0 | 4.1 | 3.9 | 3.7 | | | |
| 3 | 173681 | Stein, Hall Superfilm No. 4 | 5 | 2.4 | 29.5 | 3.8 | 3.2 | 3.2 | | | |
| 4 | 173430 | 95% oxidized cornstarch, 1.2% borax cook | 5 | 2.4 | 29.5 | 14.1 | 12.6 | 12.2 | 7.8 | 7.3 | 6.2 |
| 5 | 177254 | 90% oxidized cornstarch, 1.8% borax cook | 5 | 3.3 | 27.1 | 7.9 | 5.7 | 4.6 | | 2.9 | 3.0 |
| 6 | 177253 | 90% oxidized cornstarch, 3.6% borax cook | 5 | 2.8 | 27.1 | 6.8 | 5.2 | 4.6 | | 3.0 | 2.6 |
| 7 | 178226 | 90% oxidized cornstarch, 1.8% borax cook | 5 | 2.5 | 29.3 | 11.0 | 7.9 | 6.8 | 4.4 | 3.5 | 3.8 |
| 8 | 178330 | 96% oxidized cornstarch, 1.8% borax cook | 5 | 2.3 | 30.8 | 13.4 | 10.6 | 8.8 | 6.3 | 5.5 | 4.7 |
| 9 | 178525 | 96% oxidized cornstarch, 1.8% cook, air dried | 5 | 2.6 | 30.5 | 12.1 | 11.0 | 8.8 | 5.6 | 4.7 | 4.6 |
| 10 | 178526 | 96% oxidized cornstarch, 1.8% borax cook, short steam dry | 5 | 2.6 | 25.5 | 14.6 | 9.2 | 9.3 | 5.3 | 4.6 | 4.5 |
| 11 | 178527 | 96% oxidized cornstarch, 1.8% borax cook, 5 min. steam dry | 5 | 2.6 | 26.7 | 12.0 | 10.6 | 8.7 | 6.5 | 5.2 | 4.8 |
| 12 | 173484 | 95% oxidized cornstarch, bisulfite cook | 5 | 2.4 | 31.3 | 13.6 | 12.6 | 10.7 | 8.5 | 3.6 | |
| 13 | 174141 | 96% oxidized cornstarch, bisulfite cook | 10 | 4.9 | 33.0 | 17.3 | 16.6 | 14.7 | 9.6 | 7.7 | 5.8 |
| 14 | 178198 | 90% oxidized cornstarch, bisulfite cook | 5 | 2.7 | 30.5 | 12.8 | 11.5 | 9.8 | 6.8 | 5.8 | 4.7 |
| 15 | 178331 | 96% oxidized cornstarch, bisulfite cook | 5 | 2.2 | 31.7 | 13.7 | 12.2 | 11.0 | 8.8 | 7.5 | 6.4 |
| 16 | 178558 | 96% oxidized cornstarch, bisulfite cook, air dried | 5 | 2.2 | 30.3 | 10.8 | 9.4 | 8.4 | 6.6 | 5.8 | 4.8 |
| 17 | 178559 | 96% oxidized cornstarch, bisulfite cook, short steam dry | 5 | 2.2 | 30.4 | 10.9 | 8.8 | 8.7 | 6.4 | 5.4 | 5.2 |
| 18 | 178860 | 96% oxidized cornstarch, bisulfite cook, 5 min. steam dry | 5 | 2.2 | 29.3 | 11.0 | 9.5 | 8.7 | 8.3 | 5.5 | 5.5 |

Table I—Continued
WET-TENSILE STRENGTH OF RAG PAPERS TUB-SIZED WITH PERIODATE-OXIDIZED STARCHES

| Item No. | I.P.C. File No. | Treatment | Concentration size bath, percent | Uptake of size, percent | Schopper tensile in machine direction, lb./inch | | | | | | |
|---|---|---|---|---|---|---|---|---|---|---|---|
| | | | | | Dry | Wet | | | | | |
| | | | | | | 5 min. soaking | 30 min. soaking | 60 min. soaking | 4 hr. soaking | 8 hr. soaking | 16 hr. soaking |
| 19 | 178750 | 1:1 ratio of (a) Peter Cooper TG220 glue containing 0.2% alum and (b) 96% oxidized cornstarch containing 1.8% borax, air dried | 5 | 3.0 | 31.2 | 9.0 | 8.0 | 6.9 | 5.8 | 5.7 | 5.5 |
| 20 | 178751 | As Item 19, short steam dry | 5 | 3.5 | 33.1 | 10.0 | 7.8 | 7.0 | 6.0 | 6.0 | 5.3 |
| 21 | 178752 | As Item 19, 5 min. steam dry | 5 | 3.5 | 33.5 | 9.6 | 8.8 | 7.5 | 6.0 | 6.0 | 6.0 |
| 22 | 178789 | 1:1 ratio of (a) Peter Cooper TG220 glue, no alum, and (b) 88% oxidized cornstarch containing 1.8% borax, air dried | 5 | 3.8 | 32.7 | 10.7 | 8.8 | 7.3 | 5.7 | 5.3 | 4.9 |
| 23 | 178790 | As Item 22, short steam dry | 5 | 3.8 | 31.9 | 10.4 | 8.8 | 7.6 | 6.2 | 5.9 | 5.2 |
| 24 | 178791 | As Item 22, 5 min. steam dry | 5 | 3.8 | 33.6 | 10.3 | 8.7 | 8.1 | 6.4 | 6.5 | 5.8 |
| 25 | 179271 | 93% oxidized waxy cornstarch, 1.8% borax cook | 5 | 2.2 | 28.0 | 8.1 | 5.8 | 5.0 | 3.7 | 3.6 | 3.6 |
| 26 | 179272 | As Item 25 | 10 | 4.6 | 29.0 | 9.8 | 7.2 | 5.5 | 3.6 | 3.2 | 3.6 |
| 27 | 179273 | 95% oxidized high amylose cornstarch, 1.8% borax cook | 5 | 2.3 | 28.2 | 7.9 | 6.3 | 4.8 | 3.7 | 3.4 | 3.5 |
| 28 | 179274 | As Item 27 | 10 | 4.7 | 30.0 | 9.7 | 6.8 | 5.3 | 3.7 | 3.3 | 3.6 |
| 29 | 179269 | 91% oxidized wheat starch, 1.8% borax cook | 5 | 2.4 | 28.5 | 9.0 | 6.5 | 4.7 | 3.8 | 3.4 | 3.4 |
| 30 | 179270 | As Item 29 | 10 | 5.1 | 26.6 | 10.6 | 7.7 | 5.9 | 3.8 | 3.4 | 3.6 |
| 31 | 179809 | 93% oxidized waxy cornstarch, bisulfite cook | 5 | 2.0 | 29.5 | 14.1 | 12.1 | 10.1 | 7.5 | 5.6 | 5.0 |
| 32 | 179810 | As Item 31 | 10 | 4.0 | 32.0 | 17.4 | 14.1 | 12.1 | 9.0 | 7.1 | 6.4 |
| 33 | 179811 | 95% high amylose cornstarch, bisulfite cook | 5 | 2.1 | 31.4 | 16.1 | 12.1 | 11.3 | 8.5 | 6.9 | 5.6 |
| 34 | 179812 | As Item 3 | 10 | 4.1 | 32.9 | 17.7 | 14.5 | 12.5 | 10.1 | 7.8 | 7.2 |
| 35 | 179807 | 91% oxidized wheat starch | 5 | 2.3 | 33.3 | 17.7 | 14.8 | 14.0 | 10.7 | 7.8 | 7.2 |
| 36 | 179808 | As Item 36 | 10 | 4.8 | 34.2 | 20.0 | 16.9 | 15.5 | 12.5 | 10.1 | 8.3 |

| Item No. | I.P.C. File No. | Treatment | Concentration size bath, percent | Uptake of size, percent | Wet strength, percent = (Wet tensile treated paper / Dry tensile treated paper) × 100 | | | | | |
|---|---|---|---|---|---|---|---|---|---|---|
| | | | | | 5 min. soaking | 30 min. soaking | 60 min. soaking | 4 hr. soaking | 8 hr. soaking | 16 hr. soaking |
| 1 | 173429 | Untreated paper | | | 15.9 | 15.9 | 15.5 | | | |
| 2 | 174140 | Untreated paper | | | 15.2 | 14.5 | 13.7 | | | |
| 3 | 173681 | Stein, Hall Superfilm No. 4 | 5 | 2.4 | 12.9 | 10.9 | 10.9 | | | |
| 4 | 173430 | 95% oxidized cornstarch, 1.2% borax cook | 5 | 2.4 | 47.8 | 42.7 | 41.4 | 26.4 | 24.7 | 21.0 |
| 5 | 177254 | 90% oxidized cornstarch, 1.8% borax cook | 5 | 3.3 | 29.2 | 21.1 | 17.0 | | 10.7 | 11.1 |
| 6 | 177253 | 90% oxidized cornstarch, 3.6% borax cook | 5 | 2.8 | 25.1 | 19.2 | 17.0 | | 11.1 | 9.6 |
| 7 | 178226 | 90% oxidized cornstarch, 1.8% borax cook | 5 | 2.5 | 37.5 | 27.0 | 23.2 | 15.0 | 11.9 | 13.0 |
| 8 | 178330 | 96% oxidized cornstarch, 1.8% borax cook | 5 | 2.3 | 43.6 | 34.5 | 28.6 | 20.5 | 17.9 | 15.3 |
| 9 | 178525 | 96% oxidized cornstarch, 1.8% borax cook, air dried | 5 | 2.6 | 39.7 | 36.1 | 28.9 | 18.4 | 15.4 | 15.1 |
| 10 | 178526 | 96% oxidized cornstarch, 1.8% borax cook, short steam dry | 5 | 2.6 | 57.2 | 36.1 | 36.5 | 20.8 | 18.0 | 17.7 |
| 11 | 178527 | 96% oxidized cornstarch, 1.8% borax cook, 5 min. steam dry | 5 | 2.6 | 45.0 | 39.7 | 32.6 | 24.4 | 19.5 | 18.0 |
| 12 | 173484 | 95% oxidized cornstarch, bisulfite cook | 5 | 2.4 | 43.5 | 40.3 | 34.2 | 27.2 | 11.5 | |
| 13 | 174141 | 96% oxidized cornstarch, bisulfite cook | 10 | 4.9 | 52.9 | 50.8 | 45.0 | 29.4 | 23.6 | 17.8 |
| 14 | 178198 | 90% oxidized cornstarch, bisulfite cook | 5 | 2.7 | 42.0 | 37.7 | 32.1 | 22.3 | 19.0 | 15.4 |
| 15 | 178331 | 96% oxidized cornstarch, bisulfite cook | 5 | 2.2 | 43.2 | 38.5 | 34.7 | 27.7 | 23.7 | 20.2 |
| 16 | 178558 | 96% oxidized cornstarch, bisulfite cook, air dried | 5 | 2.2 | 35.6 | 31.0 | 27.7 | 21.8 | 19.1 | 15.9 |
| 17 | 178559 | 96% oxidized cornstarch, bisulfite cook, short steam dry | 5 | 2.2 | 35.9 | 29.0 | 28.6 | 21.1 | 17.8 | 17.1 |
| 18 | 178560 | 96% oxidized cornstarch, bisulfite cook, 5 min. steam dry | 5 | 2.2 | 37.5 | 32.4 | 29.7 | 28.3 | 18.8 | 18.8 |
| 19 | 178750 | 1:1 ratio of (a) Peter Cooper TG220 glue containing 0.2% alum and (b) 96% oxidized cornstarch containing 1.8% borax, air dried | 5 | 3.0 | 28.9 | 25.7 | 22.1 | 18.6 | 18.3 | 17.7 |
| 20 | 178751 | As Item 19, short steam dry | 5 | 3.5 | 30.2 | 23.6 | 21.1 | 18.1 | 18.1 | 16.0 |
| 21 | 178752 | As Item 19, 5 min. steam dry | 5 | 3.5 | 28.7 | 26.3 | 22.4 | 17.9 | 17.9 | 17.9 |
| 22 | 178789 | 1:1 ratio of (a) Peter Cooper TG220 glue, no alum, and (b) 88% oxidized cornstarch containing 1.8% borax, air dried | 5 | 3.8 | 32.7 | 26.9 | 22.3 | 17.4 | 16.2 | 15.0 |
| 23 | 178790 | As Item 22, short steam dry | 5 | 3.8 | 32.6 | 27.6 | 23.9 | 19.5 | 18.5 | 16.3 |
| 24 | 178791 | As Item 22, 5 min. steam dry | 5 | 3.8 | 30.7 | 25.9 | 24.1 | 19.1 | 19.4 | 17.3 |
| 25 | 179271 | 93% oxidized waxy corn starch, 1.8% borax cook | 5 | 2.2 | 28.9 | 20.7 | 17.9 | 13.2 | 12.9 | 12.9 |
| 26 | 179272 | As Item 25 | 10 | 4.6 | 33.8 | 24.8 | 19.0 | 12.4 | 11.0 | 12.4 |
| 27 | 179273 | 95% oxidized high amylose cornstarch, 1.8% borax cook | 5 | 2.3 | 28.0 | 22.4 | 17.0 | 13.1 | 12.1 | 12.4 |
| 28 | 179274 | As Item 27 | 10 | 4.7 | 32.3 | 22.7 | 17.7 | 12.3 | 11.0 | 12.0 |
| 29 | 179269 | 91% oxidized wheat starch, 1.8% borax cook | 5 | 2.4 | 31.6 | 22.8 | 16.5 | 13.4 | 11.9 | 11.9 |
| 30 | 179270 | As Item 29 | 10 | 5.1 | 39.8 | 28.9 | 22.2 | 14.3 | 12.8 | 13.5 |
| 31 | 179809 | 93% oxidized waxy cornstarch, bisulfite cook | 5 | 2.0 | 47.8 | 41.0 | 34.2 | 25.4 | 19.0 | 17.0 |
| 32 | 179810 | As Item 31 | 10 | 4.0 | 54.3 | 44.0 | 37.8 | 28.1 | 22.4 | 20.0 |
| 33 | 179811 | 95% high amylose cornstarch, bisulfite cook | 5 | 2.1 | 51.4 | 38.6 | 36.0 | 27.1 | 22.0 | 17.9 |
| 34 | 179812 | As Item 3 | 10 | 4.1 | 53.8 | 44.1 | 38.0 | 30.7 | 23.7 | 21.9 |
| 35 | 179807 | 91% oxidized wheat starch | 5 | 2.3 | 53.1 | 44.4 | 42.0 | 32.1 | 23.4 | 21.6 |
| 36 | 179808 | As Item 35 | 10 | 4.8 | 58.4 | 49.3 | 45.3 | 36.5 | 29.5 | 24.2 |

*Table II*

WET-TENSILE STRENGTH OF WOOD PULP PAPERS BEATER-SIZED WITH SYNTHETIC RESINS

| Item No. | I.P.C. File No. | Treatment | Resin added, basis dry fiber, percent | Schopper tensile, lb./inch | | | | | | | Wet tensile treated paper / Dry tensile treated paper ×100 | | | |
|---|---|---|---|---|---|---|---|---|---|---|---|---|---|---|
| | | | | Dry | Wet | | | | | | | | | |
| | | | | | 5 min. soaking | 30 min. soaking | 60 min. soaking | 4 hr. soaking | 8 hr. soaking | 16 hr. soaking | 5 min. soaking | 4 hr. soaking | 8 hr. soaking | 16 hr. soaking |
| 1 | 178772 | Control, none | 0 | 21.1 | 1.1 | | | 1.1 | | 1.0 | 5.2 | 5.2 | | 4.7 |
| 2 | 178775 | Control, rosin and alum. | 0 | 18.8 | 1.5 | | | 1.5 | | 1.5 | 8.0 | 8.0 | | 8.0 |
| 3 | 178774 | As Item 2, plus melamine-formaldehyde resin. | 2 | 19.7 | 5.8 | | | 5.8 | | 6.0 | 29.5 | 29.5 | | 30.5 |
| 4 | 178773 | As Item 3 | 3 | 21.0 | 7.7 | | | 7.6 | 7.0 | 7.6 | 36.7 | 36.2 | 33.3 | 36.2 |
| 5 | | Paper treated with cationic urea-formaldehyde resin.ᵃ | 3 | | 12 | | | 10 | | 9 | | | | |

ᵃ Maxwell, C. S., Tappi 35: 220-3 (1952).

Having thus described our invention, we claim:

1. A process for improving the wet-strength of paper which comprises dispersing about from 5 to 10 percent by weight of substantially fully oxidized dialdehyde starch in an aqueous solution containing about from 1.2 to 3.6 percent by weight of borax based on the dry weight of the dialdehyde starch, heating the dispersion for about 30 minutes at a temperature of about 95° C., soaking paper in said dispersion, and then drying the paper.

2. A process for improving the wet-strength of paper which comprises dispersing about from 5 to 10 percent by weight of about from 90 to 96 percent periodate-oxidized starch in an aqueous solution containing about from 1.2 to 3.6 percent by weight of borax based on the dry weight of the oxidized starch, heating the dispersion for about 30 minutes at a temperature up to 95° C., soaking paper in said dispersion, and then drying the paper.

3. A high wet-strength paper prepared by the process of claim 1, said paper containing dispersed therein about 2.8 percent based on the original weight of the paper of substantially fully periodate-oxidized dialdehyde starch.

References Cited by the Examiner

UNITED STATES PATENTS

| | | | |
|---|---|---|---|
| 2,171,796 | 9/39 | Kelling | 162—175 X |
| 2,549,177 | 4/51 | Davidson | 117—156 |
| 2,606,188 | 8/52 | Yelland | 260—233.3 |
| 2,713,553 | 7/55 | Mehltretter | 204—79 |
| 2,783,283 | 2/57 | Sloan et al. | 260—233.3 |

OTHER REFERENCES

Casey: In Pulp and Paper, vol. I, pages 548, 549, 563–566 (1952).

Sloan et al.: Properties of Periodate Oxidized Starch, In I and EC, vol. 48, pp. 1165–1172, May–August 1956.

Jones et al.: Periodate Oxystarches in Paper Application, IN TAPPI, published by Technical Assoc. of the Pulp and Paper Industry, 115 E. 44th St., New York 16, N.Y., vol. 42, No. 10 (October 1959), pp. 862–866.

RICHARD D. NEVIUS, *Primary Examiner.*